(12) United States Patent
Ryoo et al.

(10) Patent No.: US 11,867,969 B2
(45) Date of Patent: Jan. 9, 2024

(54) OPTICAL ELEMENT DRIVING MECHANISM

(71) Applicant: TDK TAIWAN CORP., Taoyuan (TW)

(72) Inventors: Jungsuck Ryoo, Taoyuan (TW);
Chieh-An Chang, Taoyuan (TW);
Min-Hsiu Tsai, Taoyuan (TW);
Chao-Chang Hu, Taoyuan (TW);
Shu-Shan Chen, Taoyuan (TW);
Pai-Jui Cheng, Taoyuan (TW);
Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 497 days.

(21) Appl. No.: 17/112,184

(22) Filed: Dec. 4, 2020

(65) Prior Publication Data

US 2021/0173171 A1 Jun. 10, 2021

Related U.S. Application Data

(60) Provisional application No. 62/944,496, filed on Dec. 6, 2019.

(51) Int. Cl.
*G02B 7/02* (2021.01)
*H02N 2/00* (2006.01)
*G03B 5/02* (2021.01)

(52) U.S. Cl.
CPC ............... *G02B 7/026* (2013.01); *G03B 5/02* (2013.01); *H02N 2/0095* (2013.01); *G03B 2205/0061* (2013.01)

(58) Field of Classification Search
CPC .. G02B 7/026; G03B 5/02; G03B 2205/0061; H02N 2/0095
See application file for complete search history.

(56) References Cited

U.S. PATENT DOCUMENTS

| | | | | |
|---|---|---|---|---|
| 5,410,206 | A * | 4/1995 | Luecke | G02B 7/005 310/317 |
| 11,314,031 | B2 * | 4/2022 | Hu | H04N 23/60 |
| 2015/0130956 | A1 * | 5/2015 | Ohashi | H02N 2/0015 359/557 |
| 2017/0047864 | A1 * | 2/2017 | Stang | H02N 2/025 |
| 2018/0175747 | A1 * | 6/2018 | Tomura | H02N 2/0055 |
| 2018/0210194 | A1 * | 7/2018 | Nishiyama | G03B 17/08 |
| 2020/0393637 | A1 * | 12/2020 | Ryoo | H02N 2/142 |

* cited by examiner

*Primary Examiner* — Clayton E. LaBalle
*Assistant Examiner* — Diana Hancock
(74) *Attorney, Agent, or Firm* — MUNCY, GEISSLER, OLDS & LOWE, P.C.

(57) ABSTRACT

An optical element driving mechanism has an optical axis and includes a fixed portion, a movable portion, and a driving assembly. The movable portion is movable relative to the fixed portion. The driving assembly drives the movable portion to move relative to the fixed portion. The driving assembly moves in a first direction to move the movable portion in a second direction, wherein the first direction is different from the second direction.

20 Claims, 11 Drawing Sheets

OPTICAL ELEMENT DRIVING MECHANISM

CROSS-REFERENCE TO RELATED APPLICATIONS

The present application claims priority of U.S. Provisional Patent Application No. 62/944,496, filed 6 Dec. 2019, which is incorporated by reference herein in its entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature optical element driving mechanism has become an important issue.

BRIEF SUMMARY OF THE DISCLOSURE

An embodiment of the invention provides an optical element driving mechanism having an optical axis and including a fixed portion, a movable portion, and a driving assembly. The movable portion is movable relative to the fixed portion. The driving assembly drives the movable portion to move relative to the fixed portion. The driving assembly moves in a first direction to move the movable portion in a second direction, wherein the first direction is different from the second direction.

According to some embodiments of the present disclosure, the first driving assembly includes a piezoelectric element, a transmission element, a clamping element, a conversion element, two first magnetic elements and a second magnetic element. The piezoelectric element has a circular plate shape extending in a third direction and the second direction. The transmission element is connected to the piezoelectric element. The clamping element is clamped to the transmission element, and movable relative to the transmission element. The conversion element is connected to the clamping element. Two first magnetic elements are disposed on the conversion element. The second magnetic element is disposed on the movable portion. Each of the first magnetic elements has a first magnetic pole direction, and the first magnetic pole direction is neither parallel nor perpendicular to the first direction, the second direction, and the third direction. The second magnetic element has a second magnetic pole direction, and the second magnetic pole direction is parallel to the second direction. When viewed along the third direction, the first magnetic elements do not overlap, one of the first magnetic elements is closer to the piezoelectric element than the other first magnetic element, and one of the first magnetic elements is closer to a light incident surface than the other first magnetic element, and the second magnetic element is between the first magnetic elements. When viewed along the first direction, the first magnetic elements partially overlap. When viewed along the second direction, the first magnetic elements do not overlap. The transmission element is moved along the first direction by the piezoelectric element, and the clamping element and the conversion element are moved along the first direction by the transmission element, and the movable portion is driven to move along the second direction by a force between the first magnetic elements and the second magnetic element.

According to some embodiments of the present disclosure, when viewed along the third direction, the second magnetic element at least partially overlaps one of the first magnetic elements.

According to some embodiments of the present disclosure, when viewed along the third direction, the second magnetic element does not overlap any one of the first magnetic elements.

According to some embodiments of the present disclosure, the driving assembly further includes four intermediate elements contacting the conversion element and the fixed portion. The fixed portion has a fixed-portion-first-sliding surface and a fixed-portion-second-sliding surface, the conversion element has a conversion-element-first-sliding surface and a conversion-element-second-sliding surface, and the conversion-element-first-sliding surface faces the fixed-portion-first-sliding surface, the fixed-portion-first-sliding surface and the conversion-element-first-sliding surface are perpendicular to the second direction, the conversion-element-second-sliding surface faces the fixed-portion-second-sliding surface, and the conversion-element-second-sliding surface and the fixed-portion-second-sliding surface are perpendicular to the second direction. The fixed-portion-first-sliding surface is closer to the light incident surface than the fixed-portion-second-sliding surface and the conversion-element-first-sliding surface, and the conversion-element-second-sliding surface is closer to the light incident surface than the fixed-portion-second-sliding surface. The fixed-portion-first-sliding surface has a fixed-portion-first-sliding rail extending in the first direction, the conversion-element-first-sliding surface has two first grooves, the first grooves and the fixed-portion-first-sliding rail accommodate parts of two of the intermediate elements. The fixed-portion-second-sliding surface has a fixed-portion-second-sliding rail extending in the first direction, the fixed-portion-second-sliding rail extends in a direction parallel to the first direction, and the conversion-element-second-sliding surface has two second grooves, and the second grooves and the fixed-portion-second-sliding rail accommodate parts of the other two intermediate elements. When viewed along the second direction, the fixed-portion-first-sliding rail at least partially overlaps the fixed-portion-second-sliding rail.

According to some embodiments of the present disclosure, when viewed along the third direction, the intermediate elements do not overlap, and when viewed along the first direction, the intermediate elements at least partially overlap, and when viewed along the second direction, the intermediate elements at least partially overlap.

According to some embodiments of the present disclosure, the fixed portion has a first limiting surface, the movable portion has a second limiting surface, and the first limiting surface and the second limiting surface are configured to restrict a movement range of the conversion element in the first direction.

According to some embodiments of the present disclosure, the optical element driving mechanism further includes a guiding element, wherein the movable portion has a first sliding groove, and an inner wall of the first sliding groove is covered with a coating, and the guiding element is fixedly disposed on the fixed portion and at least partially located in the first sliding groove of the movable portion to make the movable portion move along the guiding element. When viewed along the third direction, the guiding element and the conversion element at least partially overlap. The movable portion further has a second sliding groove, and the first sliding groove and the second sliding groove are at least closed-typed or non-closed-typed. The movable portion has a top surface and a bottom surface, the fixed portion has an inner top wall and an inner bottom wall, the top surface faces the inner top wall and the bottom surface faces the inner bottom wall, the top surface, the bottom surface, the inner top wall and the inner bottom wall are perpendicular to the second direction. When viewed along the third direction, a first distance between the top surface and the inner top wall is shorter than a length of the guiding element in the second direction. When viewed along the third direction, a second distance between the bottom surface and the inner bottom wall is shorter than the length of the guiding element in the second direction.

According to some embodiments of the present disclosure, the guiding element has a cylindrical structure and extends in the second direction.

According to some embodiments of the present disclosure, the guiding element has a spherical structure.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
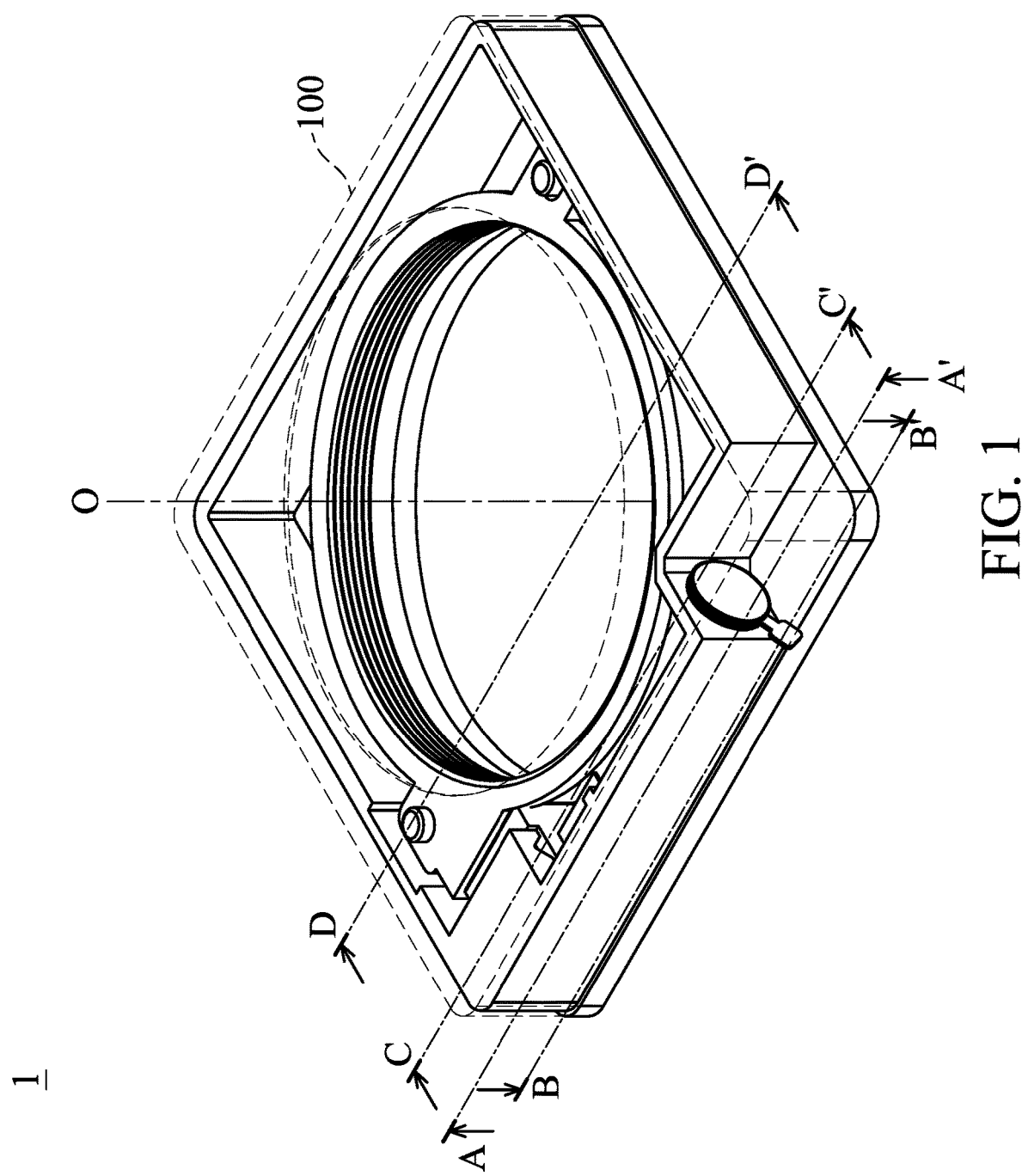
FIG. 1 is a perspective view of an optical element driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
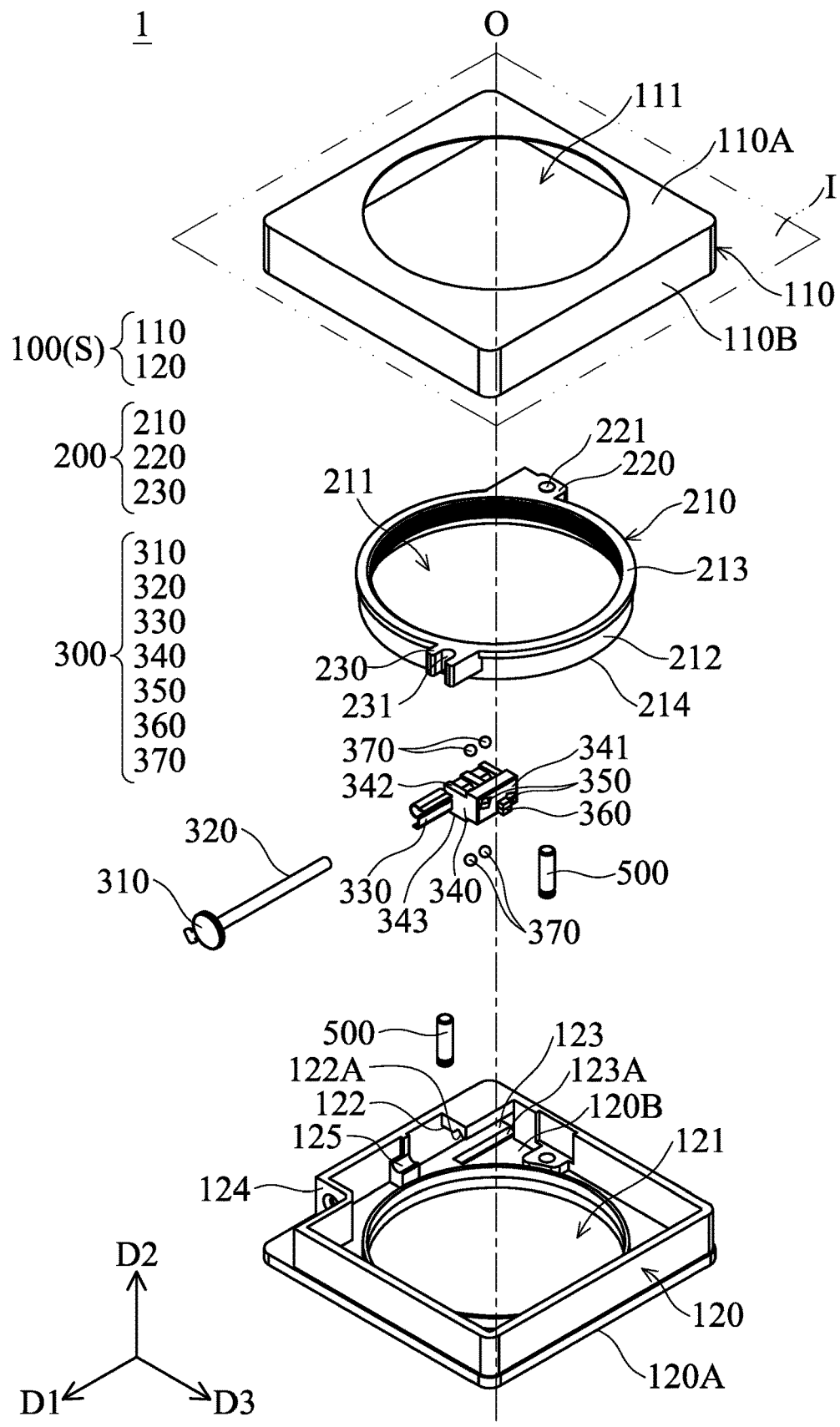
FIG. 2 is an exploded view of an optical element driving mechanism according to an embodiment of the present disclosure.

Refer to FIG. 1 and FIG. 2. FIG. 1 is a perspective view of an optical element driving mechanism 1 according to an embodiment of the present disclosure. Some elements are shown as transparent by dotted lines to clearly show the configuration of each element. FIG. 2 is an exploded view of the optical element driving mechanism 1 according to an embodiment of the disclosure. The optical element driving mechanism 1 has an optical axis O and includes a fixed portion 100, a movable portion 200, a driving assembly 300, an adhesive element 400 (refer to FIG. 6), and two guiding elements 500. The driving assembly 300 is moved in a first direction D1, which causes the movable portion 200 to move in a second direction D2. The first direction D1 is different from the second direction D2. In this embodiment, the first direction D1 is perpendicular to the second direction D2, and the second direction D2 is parallel to the optical axis O. In this embodiment, the optical element driving mechanism 1 has an auto focusing (AF) function, but it is not limited to this. In some embodiments, the optical element driving mechanism 1 may also have auto focusing and optical image stabilization (OIS) functions.

Figure 8:
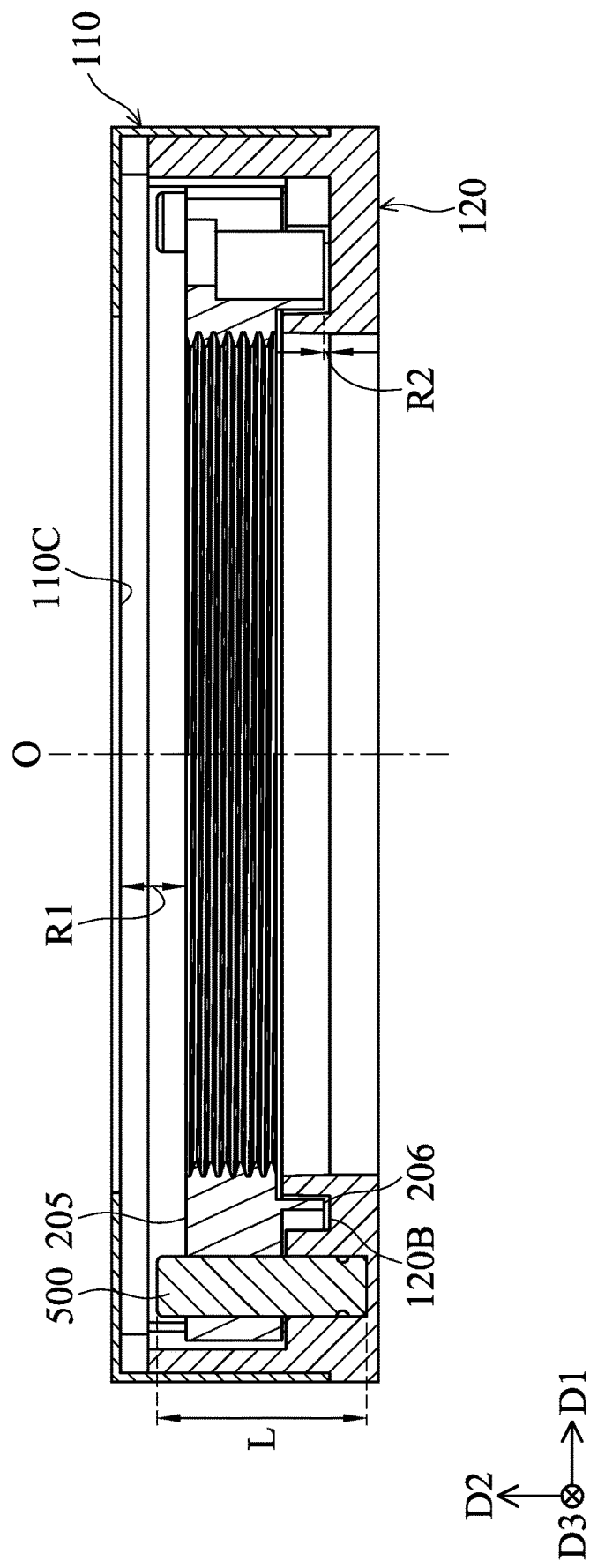
FIG. 8 is a cross-sectional view of the optical element driving mechanism cut along the line D-D' in FIG. 1.

The fixed portion 100 is a housing S, which includes a top shell 110 and a base 120. The top shell 110 includes an outer top wall 110A, four side walls 110B, and an inner top wall 110C (as shown in FIG. 8). The base 120 includes an outer bottom wall 120A, an inner bottom wall 120B, a fixed-portion-first-sliding surface 122, a fixed-portion-first-sliding rail 122A, a fixed-portion-second-sliding surface 123, and a fixed-portion-second-sliding rail 123A, a first connecting surface 124, and a second connecting surface 125. The top shell 110 has a hollow structure, and the top shell 110 may be combined with the base 120 to form the housing S of the optical element driving mechanism 1, wherein the top shell 110 constitutes the outer top wall 110A and four side walls 110B of the housing S, and the base 120 constitutes the outer bottom wall 120A of the housing S. It should be understood that the top shell 110 and the base 120 are respectively formed with a top shell opening 111 and a base opening 121, the center of the top shell opening 111 corresponds to the optical axis O, and the base opening 121 corresponds to an image sensing element (not shown) disposed outside the optical element driving mechanism 1. External light may enter the top shell 110 through the top shell opening 111, and then may pass through an optical element (not shown) and the base opening 121, and then may be received by the image sensing element to generate a digital image signal.

The movable portion 200 may be connected to the optical element and move relative to the fixed portion 100. In some embodiments, the movable portion 200 is a holder 200 having a cylindrical main body portion 210, a first sliding groove portion 220, and a second sliding groove portion 230. The first sliding groove portion 220 and the second sliding groove portion 230 extend from the main body portion 210. The main body portion 210 has a through hole 211, a side wall 212, a top surface 213, and a bottom surface 214. The first sliding groove portion 220 has a first sliding groove 221, and the second sliding groove portion 230 has a second sliding groove 231. Wherein, the through hole 211 forms a threaded structure corresponding to another threaded structure on the outer peripheral surface of the optical element, so that the optical element may be secured in the through hole 211.

Figure 3:
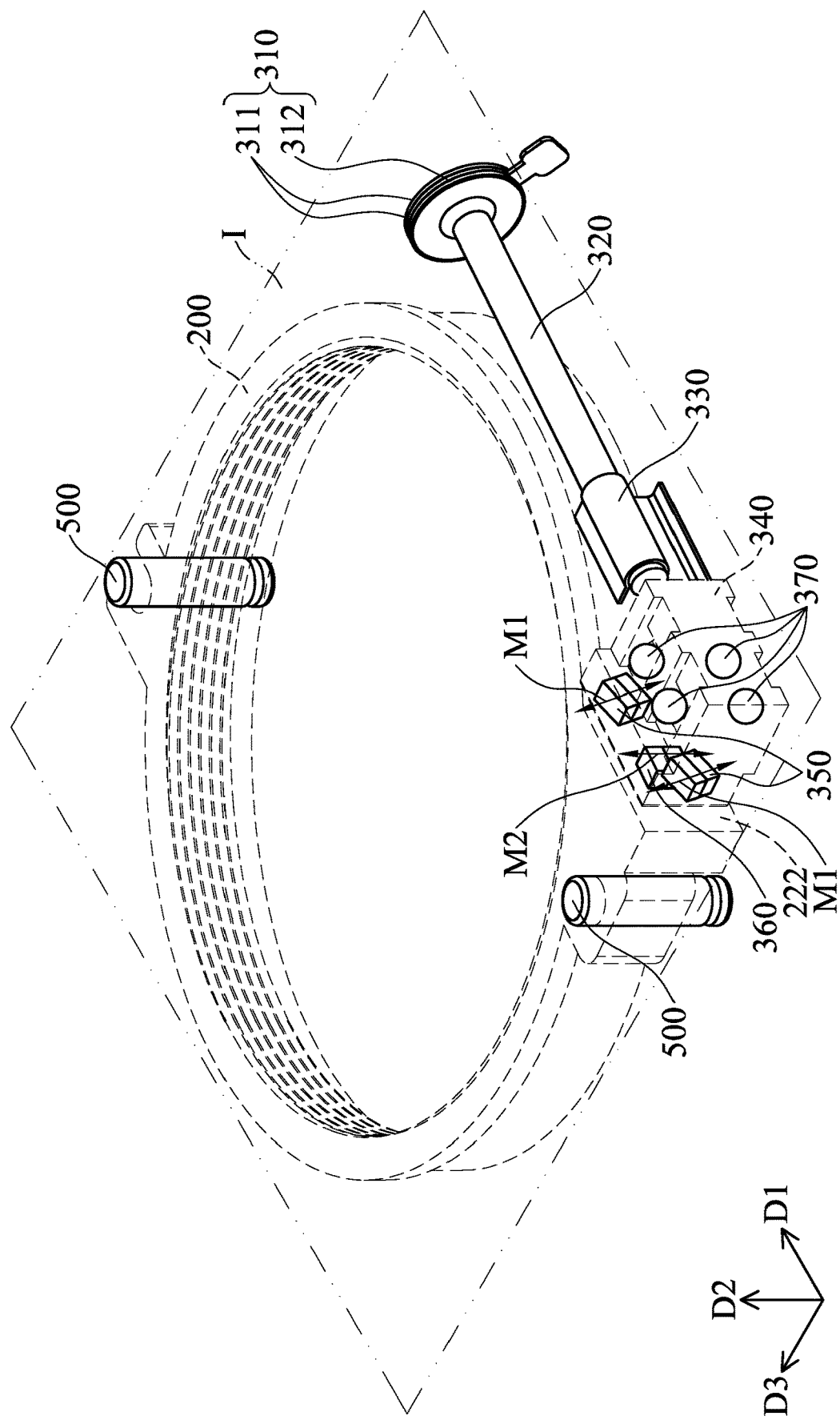
FIG. 3 is a schematic diagram of a partial structure of an optical element driving mechanism according to an embodiment of the present disclosure.

Refer to FIG. 2 and FIG. 3. FIG. 3 is a schematic diagram of a partial structure of the optical element driving mechanism 1 according to an embodiment of the present disclosure. The driving assembly 300 includes a piezoelectric element 310, a transmission element 320, a clamping element 330, a conversion element 340, two first magnetic elements 350, a second magnetic element 360, and four intermediate elements 370. The movable portion 200 and the conversion element 340 in FIG. 3 are shown as transparent by dotted lines to clearly show the configuration of each element.

In some embodiments, the piezoelectric element 310 has a circular plate shape extending in a third direction D3 and the second direction D2. The third direction D3 is perpendicular to the first direction D1, and the third direction D3 is perpendicular to the second direction D2. The piezoelectric element 310 includes two piezoelectric ceramic plates 311 and an elastic material sheet 312, and the elastic material sheet 312 is disposed between the two piezoelectric ceramic plates 311. The transmission element 320 is connected to the piezoelectric element 310. In more detail, the transmission element 320 is fixed at the center of the piezoelectric ceramic plate 311. The transmission element 320 is a cylindrical long axis, and the direction of the long axis is parallel to the first direction D1. The clamping element 330 is clamped to the transmission element 320. The clamping element 330 is made of an elastic material and has an arc shape. This arc shape matches the shape of the long shaft (transmission element 320) so that the long shaft may pass through the clamping element 330 and the clamping element 330 may be clamped on the long axis. The conversion element 340 is connected to the clamping element 330. In more detail, a part of the clamping element 330 is embedded in the conversion element 340, but it is not limited this. In some embodiments, the conversion element 340 and the clamping element 330 are integrally formed.

The two first magnetic elements 350 are disposed on the conversion element 340. In more detail, the conversion element 340 has a conversion-element side wall 341, and the conversion-element side wall 341 is provided with two recesses to accommodate the two first magnetic elements 350. The two first magnetic elements 350 respectively have a first magnetic pole direction M1. The first magnetic pole direction M1 is not parallel or perpendicular to the first direction D1, the second direction D2, and the third direction D3. When viewed along the first direction D1, the two first magnetic elements 350 partially overlap, and when viewed along the second direction D2, the two first magnetic elements 350 do not overlap. When viewed along the third direction D3, the two first magnetic elements 350 do not overlap. One of the two first magnetic elements 350 is closer to the piezoelectric element 310 than the other, and one of the two first magnetic elements 350 is closer to an light incident surface I than the other.

A second magnetic element 360 is disposed on the movable portion 200. In more detail, as shown in FIG. 3, the first sliding groove portion 220 has a first-sliding-groove-portion side wall 222, and the first-sliding-groove-portion side wall 222 is provided with a concave portion to accommodate the second magnetic element 360, and the first-sliding-groove-portion side wall 222 faces the conversion-element side wall 341 (the conversion-element side wall 341 is shown in FIG. 2). The second magnetic element 360 has a second magnetic pole direction M2, and the second magnetic pole direction M2 is parallel to the second direction D2. When viewed along the third direction D3, the second magnetic element 360 is between the two first magnetic elements 350. In some embodiments, the second magnetic element 360 at least partially overlaps one of the two first magnetic elements 350, but it is not limited this. In other embodiments, the second magnetic element 360 does not overlap any one of the two first magnetic elements 350.

Figure 4:
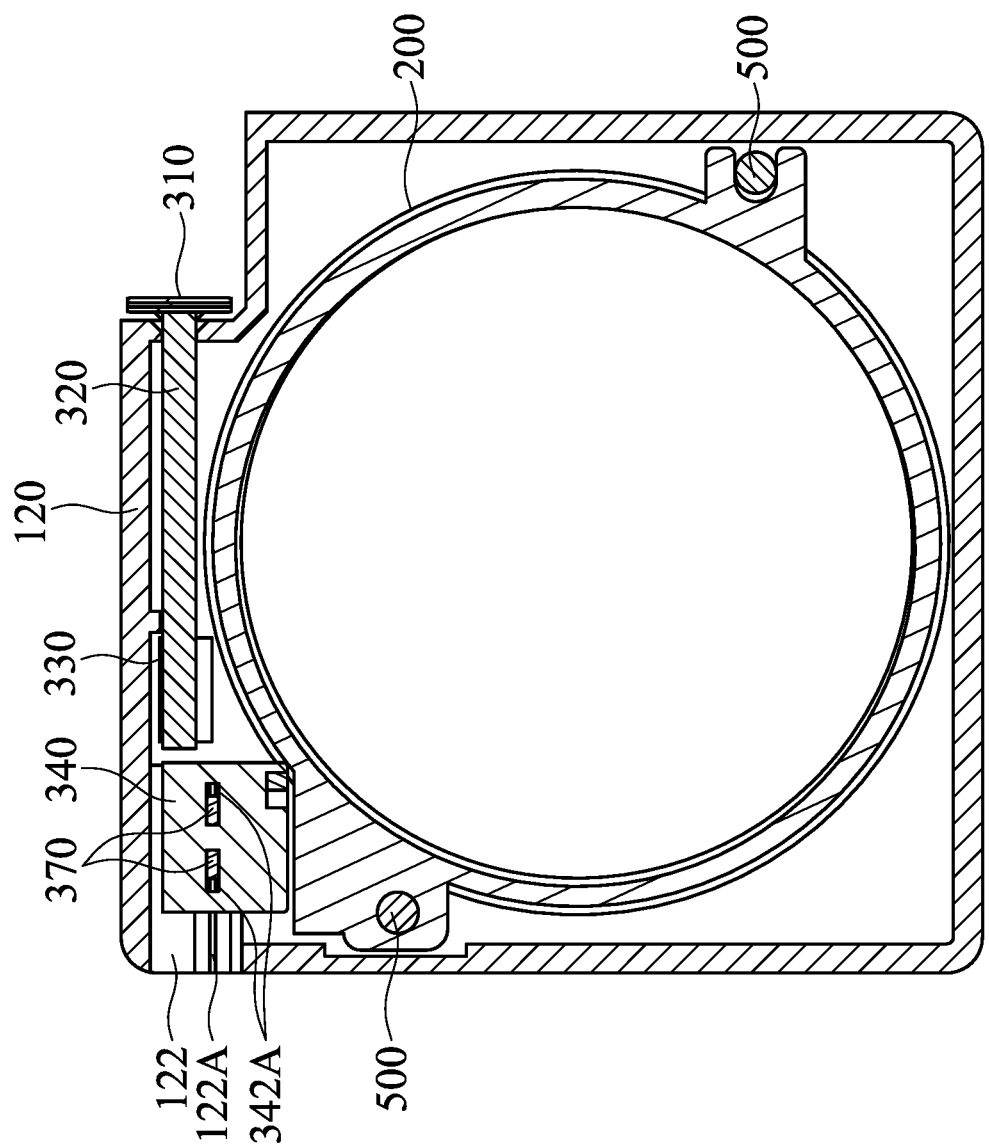
FIG. 4 is a cross-sectional view of the optical element driving mechanism cut along the line A-A' in FIG. 1.
Figure 5:
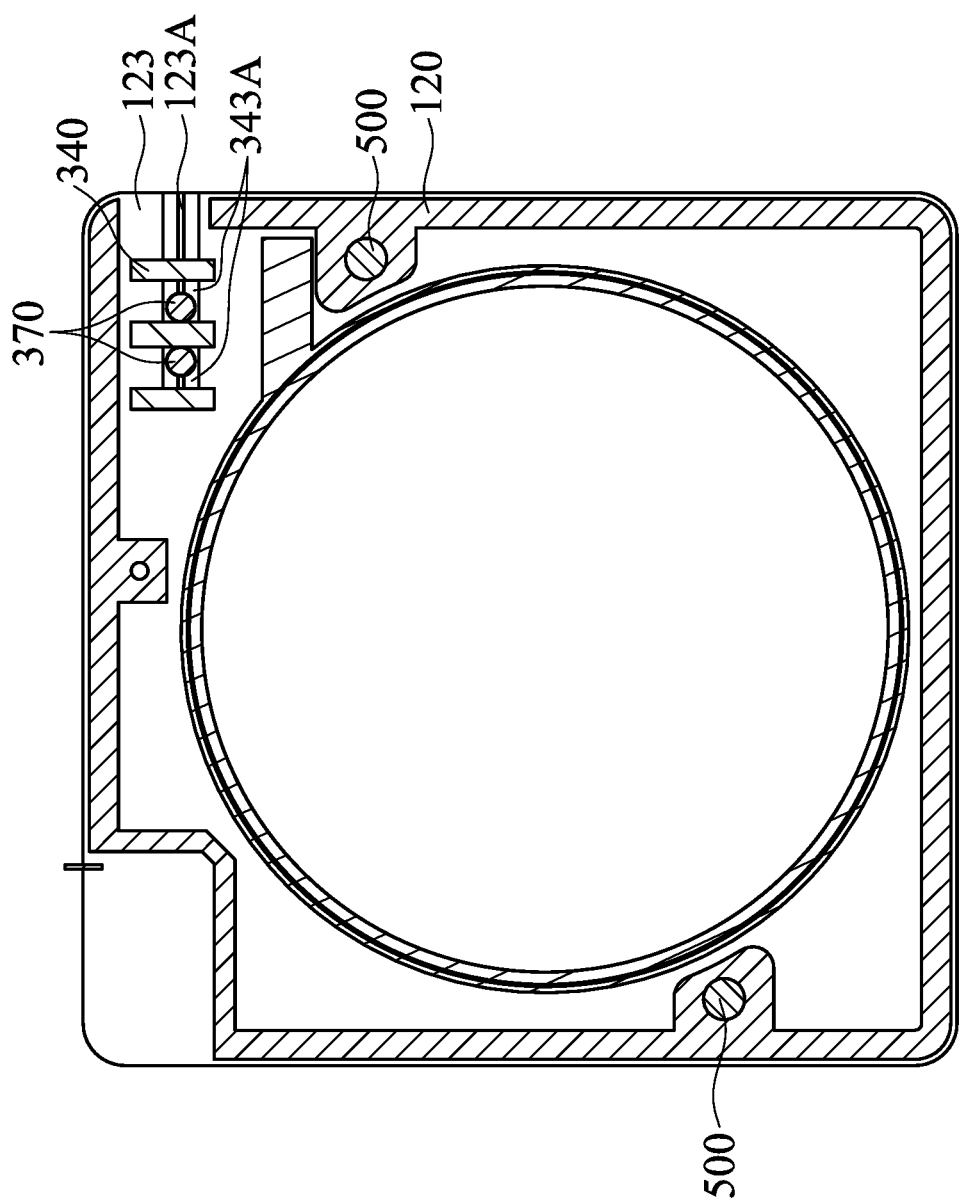
FIG. 5 is a cross-sectional view of the optical element driving mechanism cut along the line B-B' in FIG. 1.
Figure 6:
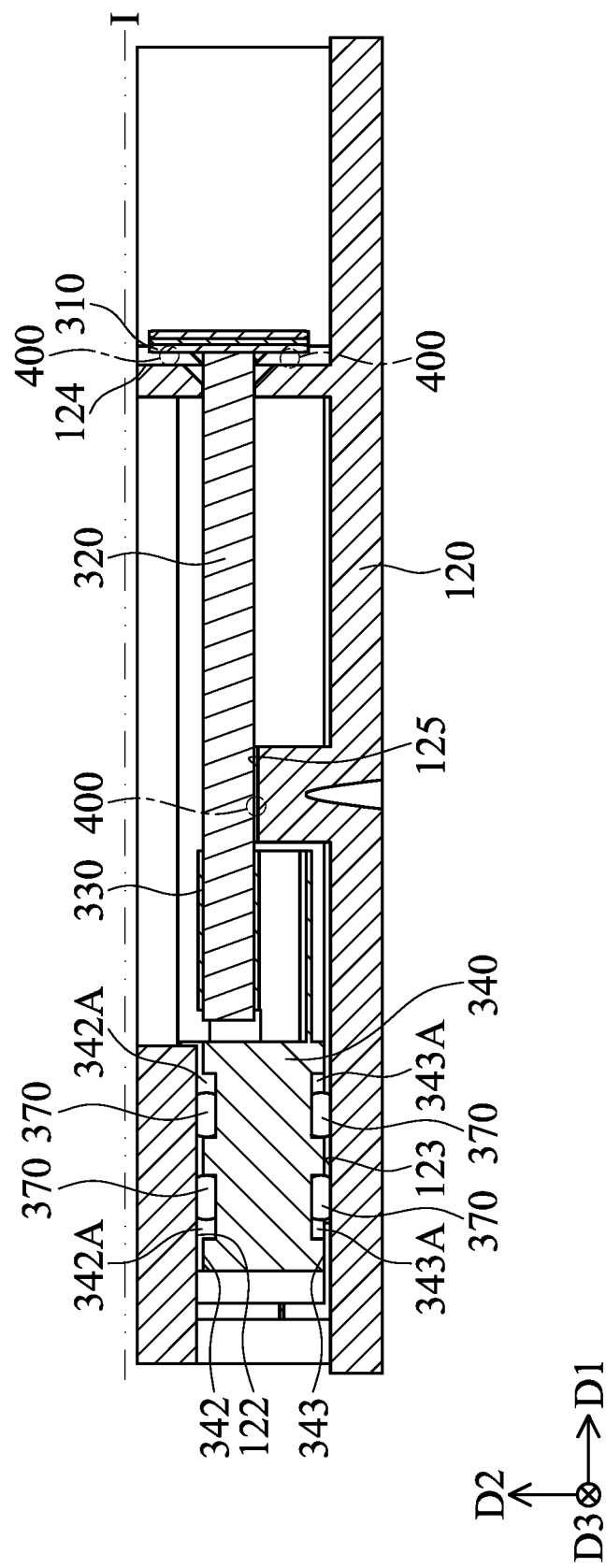
FIG. 6 is a cross-sectional view of the optical element driving mechanism cut along the line C-C' in FIG. 1.

Refer to FIG. 2 and FIG. 4 to FIG. 6. FIG. 4 is a cross-sectional view of the optical element driving mechanism 1 cut along the line A-A' in FIG. 1. FIG. 5 is a cross-sectional view of the optical element driving mechanism 1 cut along the line B-B' in FIG. 1. FIG. 6 is a cross-sectional view of the optical element driving mechanism 1 cut along the line C-C' in FIG. 1. The conversion element 340 has a conversion-element-first-sliding surface 342 and a conversion-element-second-sliding surface 343. The conversion-element-first-sliding surface 342 faces the fixed-portion-first-sliding surface 122, and the fixed-portion-first-sliding surface 122 and the conversion-element-first-sliding surface 342 is perpendicular to the second direction D2. The conversion-element-second-sliding surface 343 faces the fixed-portion-second-sliding surface 123, and the conversion-element-second-sliding surface 343 and the fixed-portion-second-sliding surface 123 are perpendicular to the second direction D2.

As shown in FIGS. 2, 4, and 6, the fixed-portion-first-sliding surface 122 is closer to the light incident surface I than the fixed-portion-second-sliding surface 123 and the conversion-element-first-sliding surface 342. The fixed-portion-first-sliding surface 122 has the fixed-portion-first-sliding rail 122A extending in the first direction D1. The conversion-element-first-sliding surface 342 has two first grooves 342A, and the two first grooves 342A respectively accommodate two intermediate elements 370. A first groove 342A and the fixed-portion-first-sliding rail 122A accommodate a part of an intermediate element 370. In other words, the intermediate elements 370 contact the conversion element 340 and the fixed portion 100. The intermediate elements 370 are movably disposed between the first groove 342A and the fixed-portion-first-sliding rail 122A. The first groove 342A limits a movement range of the intermediate elements 370. The friction between the conversion-element-first-sliding surface 342 and the fixed-portion-first-sliding surface 122 may be reduced by disposing the intermediate elements 370 on the fixed-portion-first-sliding rail 122A.

As shown in FIG. 2, FIG. 5, and FIG. 6, the conversion-element-second-sliding surface 343 is closer to the light incident surface I than the fixed-portion-second-sliding surface 123. Similar to the conversion-element-first-sliding surface 342 and the fixed-portion-first-sliding surface 122 described above, the conversion-element-second-sliding surface 343 has two second grooves 343A, and the fixed-portion-second-sliding surface 123 has the fixed-portion-second-sliding rail 123A extending in the first direction D1. The two second grooves 343A accommodate two intermediate elements 370. A second groove 343A and the fixed-portion-second-sliding rail 123A accommodate a part of an intermediate element 370. That is, the intermediate elements 370 are movably disposed between the second groove 343A and the fixed-portion-second-sliding rail 123A, and the second groove 343A limits the movement range of the intermediate elements 370. The friction between the conversion-element-second-sliding surface 343 and the fixed-portion-second-sliding surface 123 may be reduced by disposing the intermediate elements 370 on the fixed-portion-second-sliding rail 123A.

When viewed along the second direction D2, the fixed-portion-first-sliding rail 122A and the fixed-portion-second-sliding surface 123 at least partially overlap. When viewed along the third direction D3, the intermediate elements 370 do not overlap. When viewed along the first direction D1, the intermediate elements 370 at least partially overlap, and when viewed along the second direction D2, the intermediate elements 370 at least partially overlap.

In this embodiment, two intermediate elements 370 are disposed on a side of the conversion element 340 that is close to the light incident surface I, and the other two intermediate elements 370 are disposed on an opposite side of the conversion element 340 that is far away from the light incident surface I. The intermediate element 370 may move more stably in the sliding rail with the configuration described above compared with only one intermediate element 370 disposed on the two sides, or one intermediate element 370 disposed on only one side. But it is not limited to this, the number or configuration of the intermediate element 370 may be changed as required. In some embodiments, the intermediate elements 370 are fixedly disposed on the conversion element 340. In some embodiments, the intermediate elements 370 may not be provided, and the friction is reduced by changing the material between the two sliding surfaces.

Figure 7:
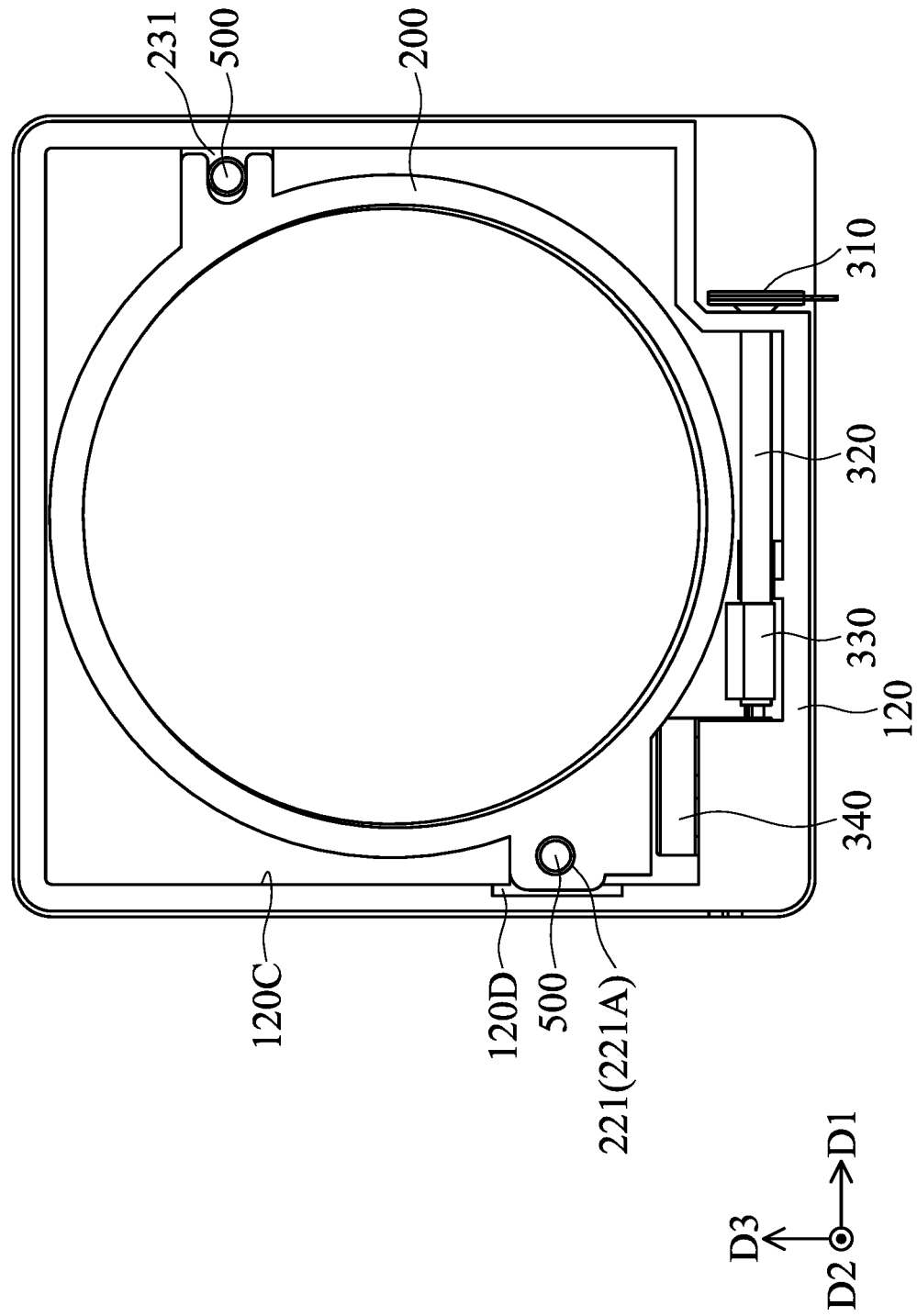
FIG. 7 is a top view of a partial structure of an optical element driving mechanism according to an embodiment of the present disclosure.

Refer to FIG. 6 and FIG. 7. FIG. 7 is a top view of a partial structure of the optical element driving mechanism 1 according to an embodiment of the present disclosure. The adhesive element 400 may be used to connect the driving assembly 300 to the fixed portion 100. In more detail, the base 120 has a first connecting surface 124 perpendicular to the first direction D1. The first connecting surface 124 faces the piezoelectric ceramic plate 311 of the piezoelectric element 310, and the adhesive element 400 may be disposed between the piezoelectric ceramic plate 311 and the first connecting surface 124. When viewed along the second direction D2, the first connecting surface 124 and the transmission element 320 at least partially overlap.

The base 120 also has a second connecting surface 125 perpendicular to the second direction D2. The second connecting surface 125 faces the transmission element 320, and the adhesive element 400 may be disposed between the transmission element 320 and the second connecting surface 125. When viewed along the second direction D2, the second connecting surface 125 and the transmission element 320 at least partially overlap. In this embodiment, the driving assembly 300 is connected to the fixed portion 100 by the adhesive element 400 which is a soft adhesive, so that the piezoelectric element 310 and the transmission element 320 may move along the first direction D1 relative to the base 120 in a specific range.

Figure 9:
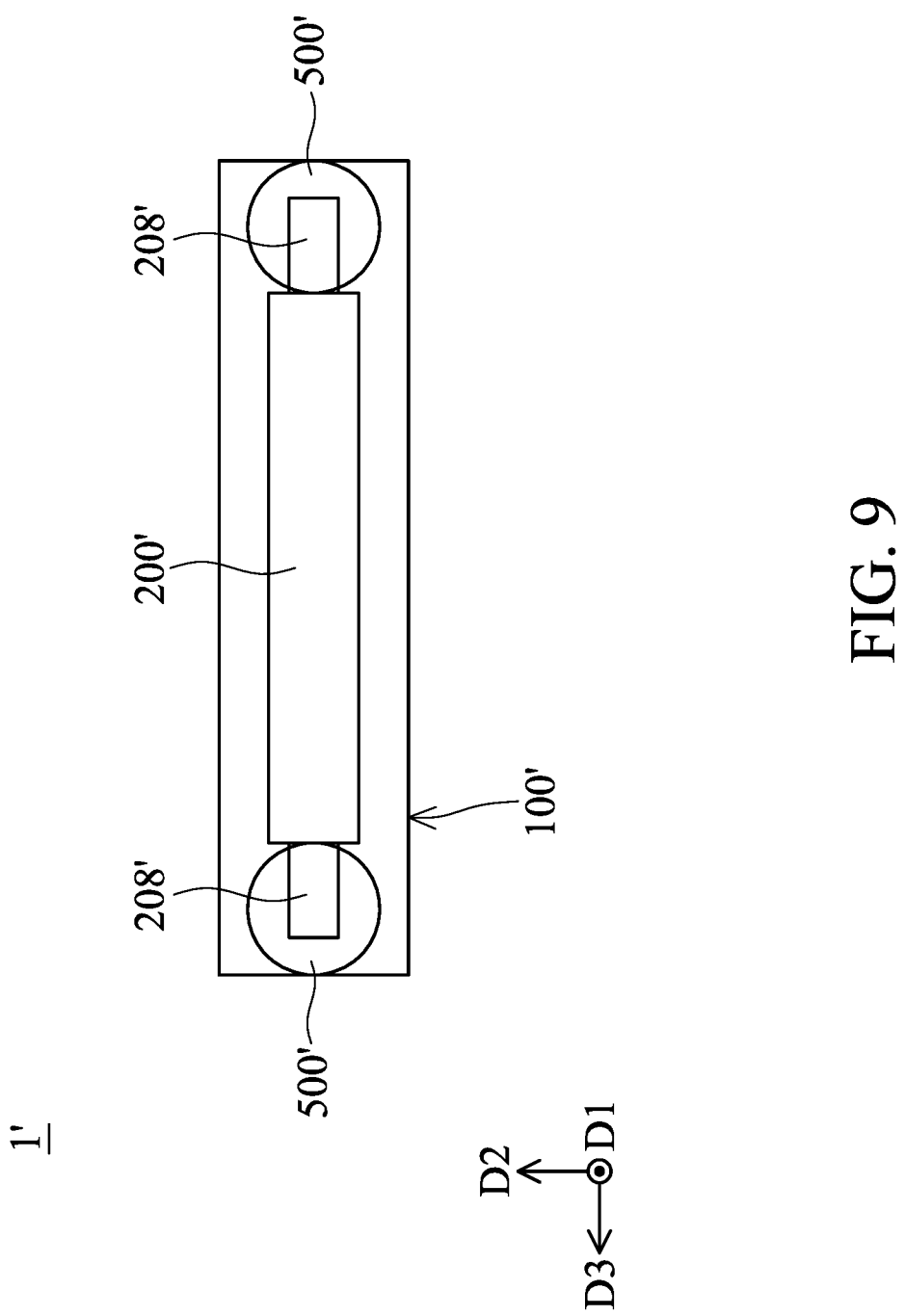
FIG. 9 is a schematic diagram of a partial structure of an optical element driving mechanism according to another embodiment of the present disclosure.

Refer to FIG. 7 to FIG. 9. FIG. 8 is a cross-sectional view of the optical element driving mechanism 1 cut along the line D-D' in FIG. 1. FIG. 9 is a schematic diagram of a partial structure of the optical element driving mechanism 1' according to another embodiment of the present disclosure. As shown in FIG. 7, two cylindrical guiding elements 500 are fixedly disposed on the base 120 of the fixed portion 100 and respectively pass through the first sliding groove 221 and the second sliding groove 231 of the movable portion 200. An inner wall 221A of the first sliding groove 221 is covered with a coating to reduce the friction between the guiding element 500 and the first sliding groove 221. In this embodiment, the optical element driving mechanism 1 has a rectangular structure. When viewed along the second direction D2, the first sliding groove 221 and the second sliding groove 231 are arranged diagonally, and the first sliding groove 221 is arranged at a corner that is close to the conversion element 340. When viewed along the third direction D3, the first sliding groove 221 and the conversion element 340 at least partially overlap.

In some embodiments, the first sliding groove 221 is closed-typed, that is, as shown in FIG. 7, the first sliding groove 221 surrounds the guiding element 500. On the other hand, the second sliding groove 231 is non-closed-typed, as shown in FIG. 7, the guiding element 500 is not completely surrounded by the second sliding groove 231. Since the first sliding groove 221 is closed-typed, a side wall 120C of the base 120 is provided with an accommodating portion 120D to accommodate a protruding part of the side wall 120C that surrounds the first sliding groove 221 and is close to the base 120. With this design structure, the space in the optical element driving mechanism 1 may be fully utilized to achieve miniaturization. And compared to a structure with only one closed-typed sliding groove, the closed-typed first sliding groove 221 may make the movable portion 200 move along the sliding groove, while the non-closed-typed second sliding groove 231 may assist in the movement of the movable portion 200 in the second direction D2. In addition, compared with a structure with two closed-typed sliding grooves, the non-closed-typed second sliding groove 231 may reduce the probability that the guiding element 500 cannot pass through the sliding groove during assembly due to manufacturing tolerances, thereby improving the assembly success rate of the optical element driving mechanism 1.

As shown in FIG. 8, the top surface 205 of the movable portion 200 faces the inner top wall 110C of the top shell 110, and the bottom surface 206 of the movable portion 200 faces the inner bottom wall 120B of the base 120. The top surface 205, the bottom surface 206, the inner top wall 110C and the inner bottom wall 120B are perpendicular to the second direction D2. When viewed along the third direction D3, a first distance R1 between the top surface 205 and the inner top wall 110C is less than a length L of the guiding element 500 in the second direction D2, and a second distance R2 between the bottom surface 206 and the inner bottom wall 120B is less than the length L of the guiding element 500 in the second direction D2. That is, the movable portion 200 will not deviate from the guiding element 500 even if the movable portion 200 reaches the maximum movement range since the guiding element 500 is long enough.

However, the guiding element 500 and the sliding groove are not limited to the structures described above, and the configuration and the number of guiding elements 500 and sliding grooves may be changed as required. For example, as shown in FIG. 9, in some embodiments, an optical element driving mechanism 1' has a structure and elements similar to the optical driving mechanism 1, wherein the guiding element 500' has a spherical structure and is fixed on two sides of the fixed portion 100'. The movable portion 200' has a sliding groove 208', and at least a part of the guiding element 500' is located in the sliding groove 208', so that the occurrence of offset may be avoided when the movable portion 200 is moved in the second direction D2.

In some embodiments, the optical element driving mechanism 1 further includes a position sensing assembly (not shown) for sensing the relative movement of the fixed portion 100 and the movable portion 200. At least a part of the position sensing assembly is disposed on the movable portion 200, and at least another part of the position sensing assembly is disposed on the fixed portion 100. For example, the position sensing assembly may include a sensing element and a sensing magnetic element, and the sensing element is disposed on the base 120 of the fixed portion 100, the sensing magnetic element is disposed on the movable portion 200. In more detail, the sensing element may be, for example, a Hall effect sensor, a magnetoresistive sensor (MR sensor), or fluxgate, etc., which are configured to sense the magnetic field of the sensing magnetic element on the holder 200 to obtain the position of the holder 200 relative to the base 120, but it is not limited to this. For example, in some embodiments, the second magnetic element 360 may also be used as the sensing magnetic element.

Figure 10:
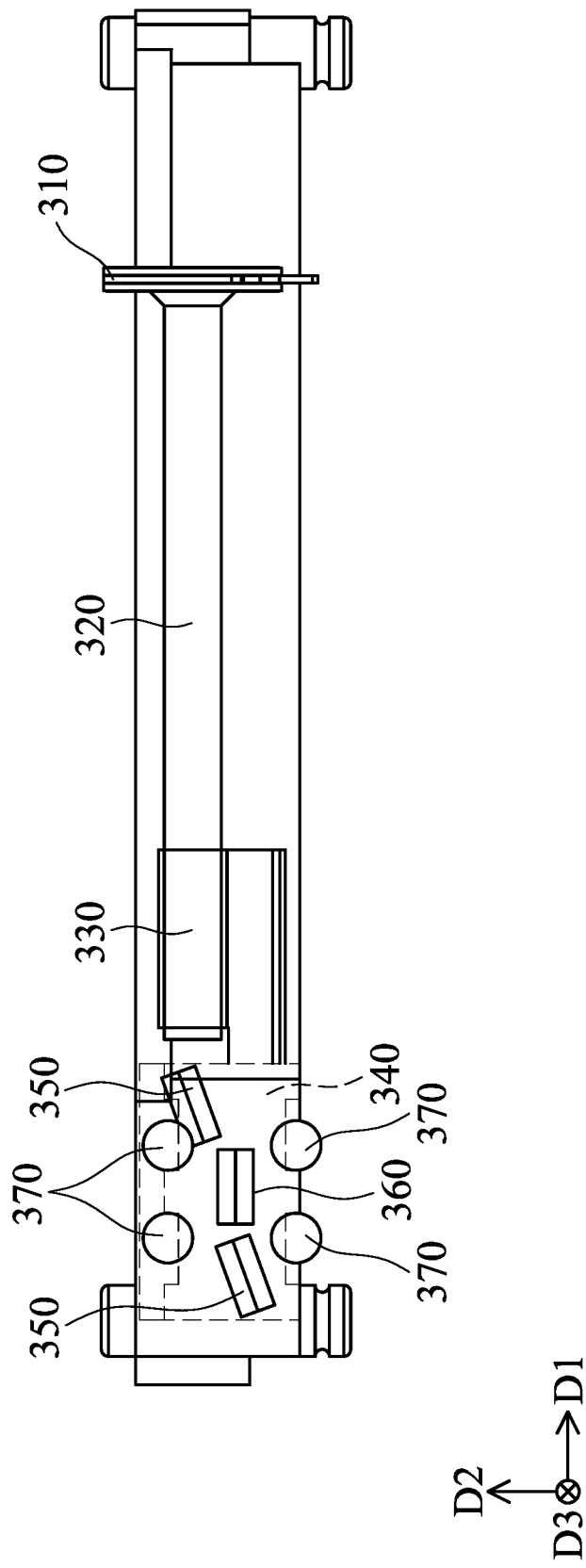
FIG. 10 is a schematic diagram of a partial structure of an optical element driving mechanism according to another embodiment of the present disclosure.
Figure 11:
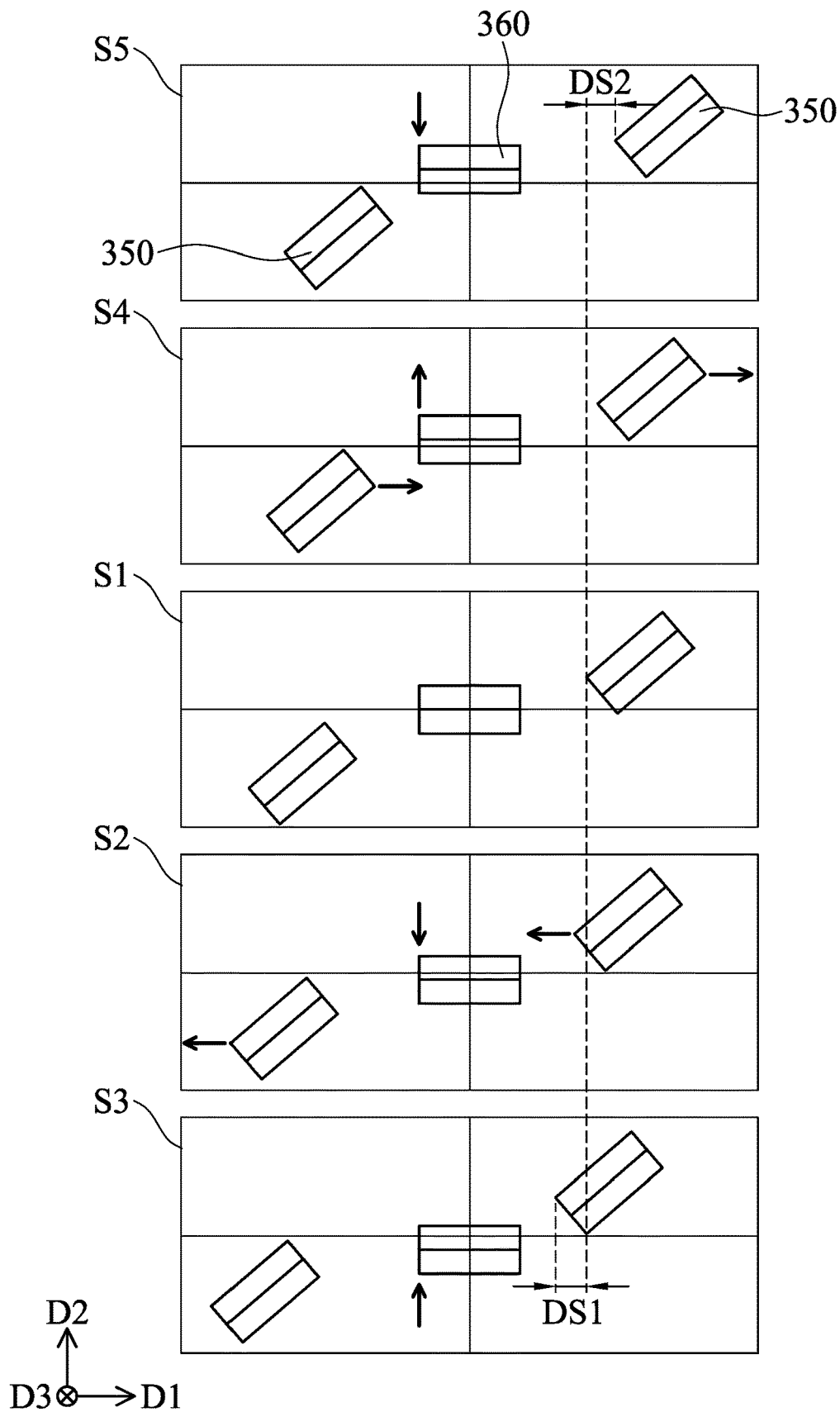
FIG. 11 is a schematic diagram of the force acting between a first magnetic element and a second magnetic element in different states.

Next, referring to FIGS. 2, 6, 10, and 11, the operation of the optical element driving mechanism 1 will be described. FIG. 10 is a schematic diagram of a partial structure of the optical element driving mechanism 1, wherein the conversion element 340 is shown as transparent by dotted lines to clearly show the configuration of each element. FIG. 11 is a schematic diagram of the force between the first magnetic element 350 and the second magnetic element 360 in different states. When a voltage is applied to the driving assembly 300, the circular-plated-shaped piezoelectric element 310 is deformed, for example, the piezoelectric element 310 is slowly bent outward (the center of the piezoelectric element 310 is closer to the first connecting surface 124 (the first connecting surface 124 is shown in FIG. 6) than the outer circumference), so that the transmission element 320 is moved away from the piezoelectric element 310 in the first direction D1. At this time, there is no relative movement between transmission element 320 and the clamping element 330 since there is a static friction between the transmission element 320 and the clamping element 330. Then, the voltage is controlled to make the piezoelectric element 310 bend inward quickly (the outer circumference of the piezoelectric element 310 is closer to the first connecting surface 124 than the center of the piezoelectric element 310), and the transmission element 320 therefore moves rapidly toward the piezoelectric element 310, and overcomes the static friction between the transmission element 320 and the clamping element 330, so that the clamping element 330 moves away from the piezoelectric element 310 in the first direction D1 relative to the transmission element 320. Since the conversion element 340 is connected to the clamping element 330, the movement of the conversion element 340 in the first direction D1 may be controlled by repeating the above steps.

When the first magnetic elements 350 disposed in the conversion element 340 moves in the first direction D1 with the conversion element 340, the force between the first magnetic elements 350 and the second magnetic element 360 also changes accordingly. As shown in a state S1 of FIG. 11, when the second magnetic element 360 is at the approximate center of the two first magnetic elements 350, the forces are balanced at this time, and the movable portion 200 remains stationary. When the first magnetic element 350 moves away from the piezoelectric element 310 in the first direction D1, as shown in a state S2, a resultant force between the two first magnetic elements 350 and the second magnetic element 360 is applied to the movable portion 200, and the direction of the resultant force is downward which make the movable portion 200 move along the guiding element 500 in the second direction D2 away from the light incident surface I.

However, when the first magnetic element 350 moves away from the piezoelectric element 310 in the first direction D1 to a first specific distance DS1, as shown in state S3, the direction of the force applied to the movable portion 200 between the two first magnetic elements 350 and the second magnetic element 360 is changed to upward, so the movable portion 200 will not move downward. When the first magnetic element 350 is moved closer to the piezoelectric element 310 in the first direction D1 from the first specific distance DS1, as shown in state S4, the direction of the force applied to the movable portion 200 between the two first magnetic elements 350 and the second magnetic element 360 is upward, so that the movable portion 200 moves along the guiding element 500 in the second direction D2 toward the light incident surface I.

When the first magnetic element 350 moves toward the piezoelectric element 310 in the first direction D1 to a second specific distance DS2, as shown in state S5, the direction of the force applied to the movable portion 200 between the two first magnetic elements 350 and the second magnetic element 360 is changed to downward, so the movable portion 200 will not move upward. Therefore, by controlling the movement of the driving assembly 300 in the first direction D1, the movement of the movable portion 200 in the second direction D2 may be controlled.

It can be seen from the description above that by changing the distance between the first magnetic elements 350 and the second magnetic element 360, the movement range of the movable portion 200 may be restricted. In this embodiment, the two first magnetic elements 350 are disposed in the conversion element 340 and the second magnetic element 360 are disposed in the movable portion 200, but it is not limited this. In addition, the direction of the configuration of the magnetic element may also be changed as required.

As shown in FIG. 7, the base 120 of the fixed portion 100 has a side wall 120C as a first limiting surface 120C. The first limiting surface 120C is perpendicular to the first direction D1 and faces a side surface of the conversion element 340. When the side surface of the conversion element 340 contacts the first limiting surface 120C, the movement of the conversion element 340 may be stopped, and the movement range of the conversion element 340 away from the piezoelectric element 310 in the first direction D1 is restricted. And by the cylindrical shape of the movable portion 200, the side wall 202 of the movable portion 200 is used as a second limiting surface 202. When the conversion element 340 contacts the second limiting surface 202, it stops moving, and the movement range of the conversion element 340 toward the piezoelectric element 310 in the first direction D1 is restricted. That is, the first limiting surface 120C and the second limiting surface 202 are configured to restrict the movement range of the conversion element 340 in the first direction D1, and the movement range of the movable portion 200 in the second direction D2 is also restricted by the first limiting surface 120C and the second limiting surface 202.

In a conventional optical element driving mechanism, the driving assembly and the movable portion move in the same direction, that is, the long axis of the transmission element is disposed parallel to the optical axis. If the movement range of the movable portion is expected to be larger, the length of the transmission element must be increased. However, it makes the optical element driving mechanism thicker in the direction of the optical axis. In contrast with the conventional optical element driving mechanism, in this embodiment, the transmission element 320 (long axis) is horizontally arranged in the optical element driving mechanism 1 (or arranged perpendicular to the optical axis O), and the piezoelectric element 310 and the conversion element 340 may be mated with the rectangular fixed portion 100 and the circular movable portion 200 and be respectively arranged at two corners of the optical element driving mechanism 1. Therefore, the transmission element 320 may be designed to be longer without affecting the overall thickness of the optical element driving mechanism 1, and the movable portion 200 may also have a larger movement range. In addition, the space between the holder 200 and the base 120 may be fully used, and thus a more miniaturized optical element driving mechanism 1 may be provided.

As described above, an embodiment of the present invention provides an optical element driving mechanism including a fixed portion, a movable portion, and a driving assembly. The movable portion is movably disposed on the fixed portion. The driving assembly is disposed on the fixed portion and drives the movable portion to move relative to the fixed portion. Therefore, a more miniaturized optical element driving mechanism may be provided that may further control the movement of the movable portion in the second direction by controlling the movement of the driving assembly in the first direction.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism having an optical axis, comprising;
   a fixed portion;
   a movable portion, moving relative to the fixed portion; and
   a driving assembly, driving the movable portion to move relative to the fixed portion comprising:
   a piezoelectric element, having a circular plate shape extending in a second direction and a third direction;
   a transmission element, connected to the piezoelectric element;
   a clamping element, clamped to the transmission element, and movable relative to the transmission element;
   a conversion element, connected to the clamping element
   two first magnetic elements, disposed on the conversion element and
   a second magnetic element, disposed on the movable portion;
   wherein the driving assembly moves in a first direction to move the movable portion in the second direction, and the first direction is different from the second direction,
   wherein each of the first magnetic elements has a first magnetic pole direction, and the first magnetic pole direction is neither parallel nor perpendicular to the first direction, the second direction, or the third direction.

2. The optical element driving mechanism as claimed in claim 1,
   wherein the second magnetic element has a second magnetic pole direction, and the second magnetic pole direction is parallel to the second direction;
   wherein when viewed along the third direction, the first magnetic elements do not overlap, one of the first magnetic elements is closer to the piezoelectric element than the other first magnetic element, and one of the first magnetic elements is closer to a light incident surface than the other first magnetic element, and the second magnetic element is between the first magnetic elements;
   wherein when viewed along the first direction, the first magnetic elements partially overlap;
   wherein when viewed along the second direction, the first magnetic elements do not overlap.

3. The optical element driving mechanism as claimed in claim 1, wherein the transmission element is moved in the first direction by the piezoelectric element, and the clamping element and the conversion element are moved in the first direction by the transmission element, and the movable portion is driven to move in the second direction by a force between the first magnetic elements and the second magnetic element.

4. The optical element driving mechanism as claimed in claim 1, wherein when viewed along the third direction, the second magnetic element at least partially overlaps one of the first magnetic elements.

5. The optical element driving mechanism as claimed in claim 1, wherein when viewed along the third direction, the second magnetic element does not overlap any one of the first magnetic elements.

6. The optical element driving mechanism as claimed in claim 1, wherein the driving assembly further comprises four intermediate elements contacting the conversion element and the fixed portion;
   wherein the fixed portion has a fixed-portion-first-sliding surface and a fixed-portion-second-sliding surface, the conversion element has a conversion-element-first-sliding surface and a conversion-element-second-sliding surface, and the conversion-element-first-sliding surface faces the fixed-portion-first-sliding surface, the fixed-portion-first-sliding surface and the conversionelement-first-sliding surface are perpendicular to the second direction, the conversion-element-second-sliding surface faces the fixed-portion-second-sliding surface, and the conversion-element-second-sliding surface and the fixed-portion-second-sliding surface are perpendicular to the second direction.

7. The optical element driving mechanism as claimed in claim 6, wherein the fixed-portion-first-sliding surface is closer to the light incident surface than the fixed-portion-second-sliding surface and the conversion-element-first-sliding surface, and the conversion-element-second-sliding surface is closer to the light incident surface than the fixed-portion-second-sliding surface.

8. The optical element driving mechanism as claimed in claim 7, wherein the fixed-portion-first-sliding surface has a fixed-portion-first-sliding rail extending in the first direction, the conversion-element-first-sliding surface has two first grooves, the first grooves and the fixed-portion-first-sliding rail accommodate parts of two of the intermediate elements.

9. The optical element driving mechanism as claimed in claim 8, wherein the fixed-portion-second-sliding surface has a fixed-portion-second-sliding rail extending in the first direction, the fixed-portion-second-sliding rail extends in a direction parallel to the first direction, and the conversion-element-second-sliding surface has two second grooves, and the second grooves and the fixed-portion-second-sliding rail accommodate parts of the other two intermediate elements.

10. The optical element driving mechanism as claimed in claim 9, wherein when viewed along the second direction, the fixed-portion-first-sliding rail at least partially overlaps the fixed-portion-second-sliding rail.

11. The optical element driving mechanism as claimed in claim 10, wherein when viewed along the third direction, the intermediate elements do not overlap, and when viewed along the first direction, the intermediate elements at least partially overlap, and when viewed along the second direction, the intermediate elements at least partially overlap.

12. The optical element driving mechanism as claimed in claim 1, wherein the fixed portion has a first limiting surface, the movable portion has a second limiting surface, and the first limiting surface and the second limiting surface are configured to restrict a movement range of the conversion element in the first direction.

13. The optical element driving mechanism as claimed in claim 1, further comprising a guiding element, wherein the movable portion has a first sliding groove, and an inner wall of the first sliding groove is covered with a coating, and the guiding element is fixedly disposed on the fixed portion and at least partially located in the first sliding groove of the movable portion to make the movable portion move along the guiding element.

14. The optical element driving mechanism as claimed in claim 13, wherein when viewed along the third direction, the guiding element and the conversion element at least partially overlap.

15. The optical element driving mechanism as claimed in claim 13, wherein the movable portion further has a second sliding groove, and the first sliding groove and the second sliding groove are at least closed-typed or non-closed-typed.

16. The optical element driving mechanism as claimed in claim 13, wherein the movable portion has a top surface and a bottom surface, the fixed portion has an inner top wall and an inner bottom wall, the top surface faces the inner top wall and the bottom surface faces the inner bottom wall, the top surface, the bottom surface, the inner top wall and the inner bottom wall are perpendicular to the second direction.

17. The optical element driving mechanism as claimed in claim 16, wherein when viewed along the third direction, a first distance between the top surface and the inner top wall is smaller than a length of the guiding element in the second direction.

18. The optical element driving mechanism as claimed in claim 17, wherein when viewed along the third direction, a second distance between the bottom surface and the inner bottom wall is shorter than the length of the guiding element in the second direction.

19. The optical element driving mechanism as claimed in claim 13, wherein the guiding element has a cylindrical structure and extends in the second direction.

20. The optical element driving mechanism as claimed in claim 13, wherein the guiding element has a spherical structure.

* * * * *